US006305319B1

(12) United States Patent
Olsson

(10) Patent No.: US 6,305,319 B1
(45) Date of Patent: Oct. 23, 2001

(54) ROTATING BIRD FEEDER

(76) Inventor: Janne Olsson, Perserud 67192, Arvika (SE)

( * ) Notice: Subject to any disclaimer, the term of this patent is extended or adjusted under 35 U.S.C. 154(b) by 0 days.

(21) Appl. No.: 09/244,536

(22) Filed: Feb. 4, 1999

(51) Int. Cl.$^7$ .................................................. A01K 39/01
(52) U.S. Cl. ............................................................ 119/51.01
(58) Field of Search ................................. 119/52.1, 52.2, 119/57.8, 57.9, 428, 455, 456, 459, 464, 61

(56) References Cited

U.S. PATENT DOCUMENTS

| | | | |
|---|---|---|---|
| 2,487,087 | * 11/1949 | Anderson | 119/52.2 |
| 4,767,088 | * 8/1988 | Fielder et al. | 119/57.9 |
| 5,165,364 | * 11/1992 | Horkey | 119/57.8 |
| 5,560,314 | * 10/1996 | Wessinger | 119/428 |
| 5,699,752 | * 12/1997 | Wilkins | 119/51.03 |

* cited by examiner

Primary Examiner—Thomas Price
(74) Attorney, Agent, or Firm—Robert M. Sperry

(57) ABSTRACT

An improved bird feeder having a freely rotatable hub, a plurality of arms projecting radially substantially beyond the rim of the hub and a plurality of feeding baskets, each suspended from a respective one of the arms.

12 Claims, 3 Drawing Sheets

ROTATING BIRD FEEDER

FIELD OF INVENTION

This invention relates to animal feeding devices and is particularly directed to bird feeders having a plurality of feeding baskets suspended from a plurality of arms radiating from a central rotatable hub.

PRIOR ART

It is common practice to provide bird feeders, especially in winter, to attract a variety of birds to a residential yard or the like, where the residents can observe the birds as they feed. The coloring of the birds and the interaction between the birds provide ongoing entertainment, amusement and education for those watching. Traditionally, bird feeders are simply trays mounted on a pole or the like to protect the feeding birds from predators, such as cats or dogs. Other prior art bird feeders are hung from tree branches or the like and have a reservoir of birdseed or the like which spills feed onto a feeding tray for the birds. Some prior art bird feeders provide a wheel having plurality of feeding baskets or the like suspended about the rim of the wheel to enable several types of birds to feed simultaneously without conflict. However, virtually all of the prior art bird feeders are stationary devices, since it has been assumed that movement of the feeder might scare the birds away, whereas a primary purpose of the feeders is to attract the birds. In contrast, Applicant has found that providing a rotatable feeder, having a plurality of feeding stations, will not scare the birds and will cause considerable interaction between the birds which is highly amusing and interesting. Thus, none of the prior art bird feeders have been entirely satisfactory.

BRIEF SUMMARY AND OBJECTS OF INVENTION

These disadvantages of the prior art are overcome with the present invention and improved bird feeders are provided which will not scare the birds and will cause considerable interaction between the birds which is highly amusing and interesting.

The advantages of the present invention are preferably attained by providing an improved bird feeder having a freely rotatable hub, a plurality of arms projecting radially substantially beyond the rim of said hub and a plurality of feeding baskets, each suspended from a respective one of said arms.

Accordingly, it is an object of the present invention to provide an improved bird feeder.

Another object of the present invention is to provide an improved bird feeder having a plurality of feeding stations.

An additional object of the present invention is to provide an improved bird feeder which does not scare the birds.

A further object of the present invention is to provide an improved bird feeder which is rotatable.

Another object of the present invention is to provide an improved bird feeder which will cause considerable interaction between the birds which is highly amusing and interesting.

A specific object of the present invention is to provide an improved bird feeder having a freely rotatable hub, a plurality of arms projecting radially substantially beyond the rim of said hub and a plurality of feeding baskets, each suspended from a respective one of said arms.

These and other objects and features of the present invention will be apparent from the following detailed description, taken with reference to the figures of the accompanying drawing.

DETAILED DESCRIPTION OF THE INVENTION

Figure 1:
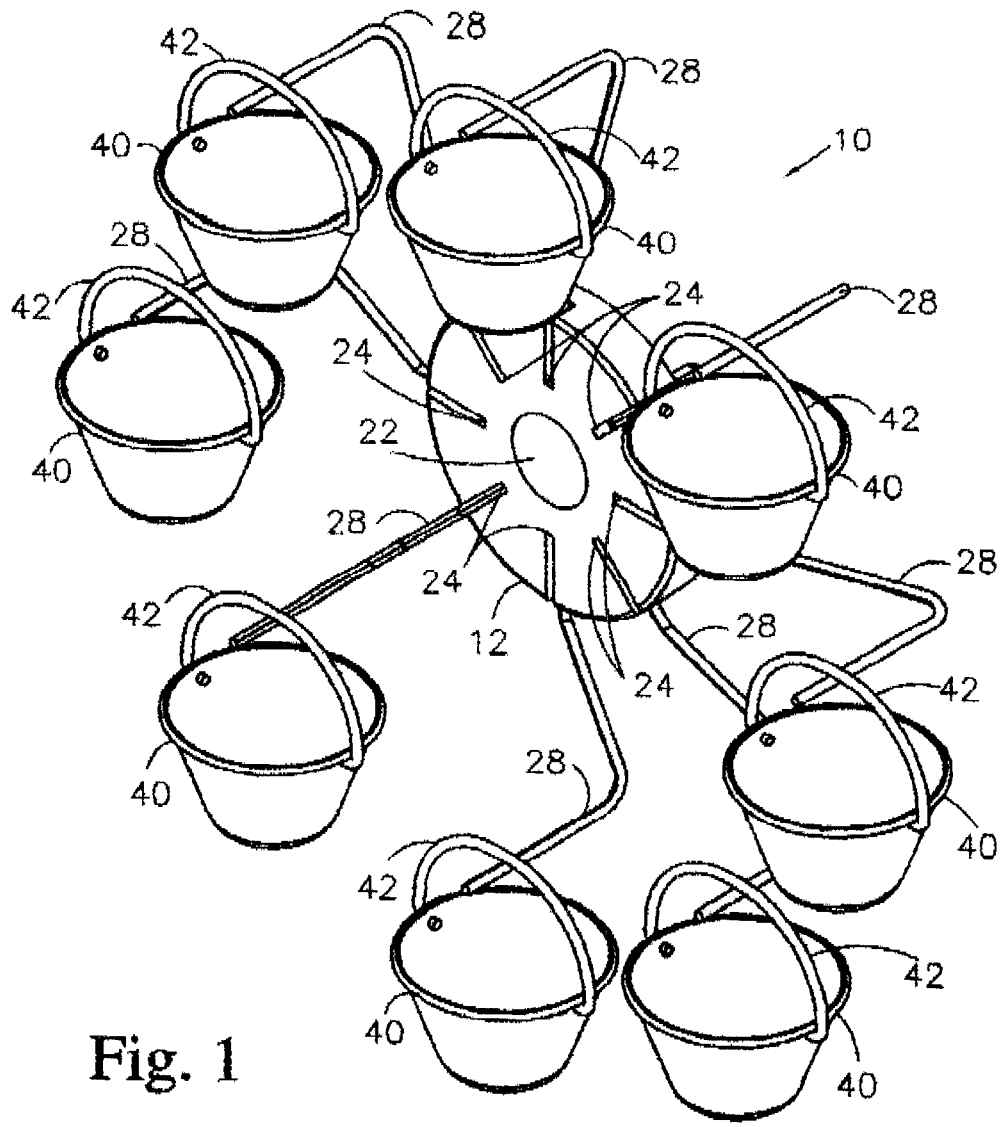
FIG. 1 is a front view of a bird feeder embodying the present invention.
Figure 2:
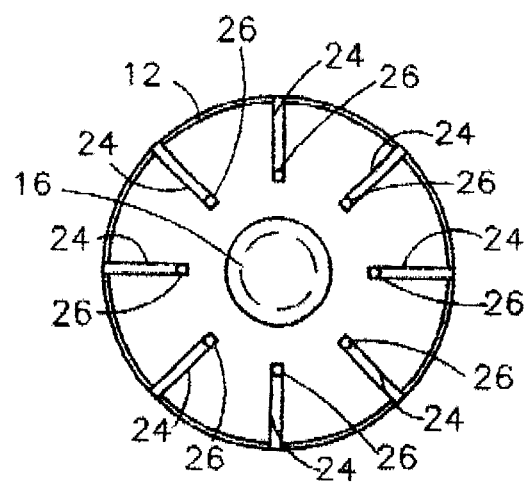
FIG. 2 is a front view of the hub of the bird feeder of FIG. 1.
Figure 3:
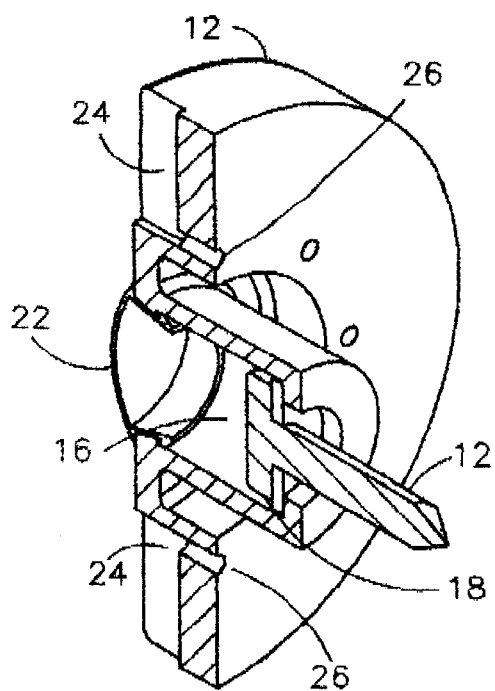
FIG. 3 is a vertical section through the hub of FIG. 2.
Figure 4:
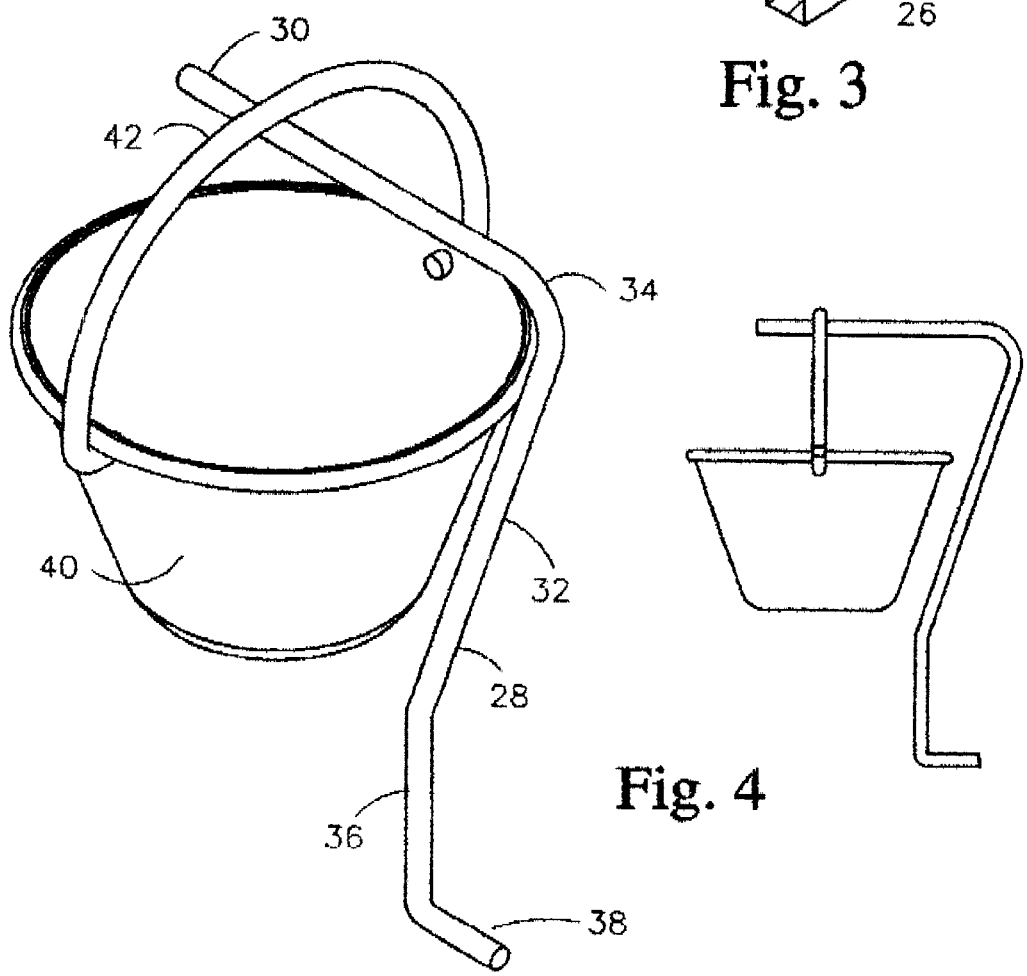
FIG. 4 is a side view of one of the arms of the bird feeder of FIG. 1.
Figure 5:
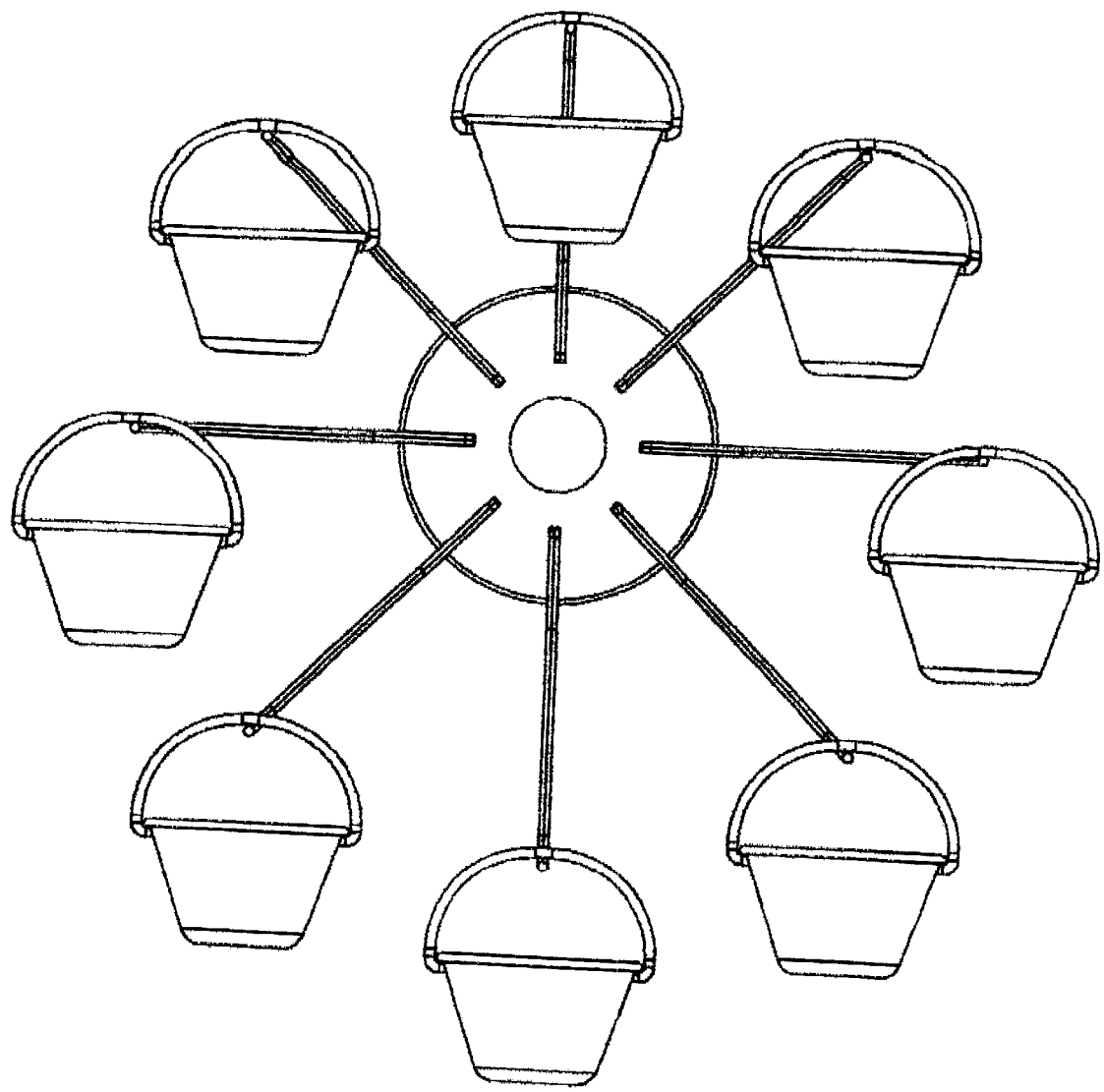
FIG. 5 is a side view of the bird feeder of FIG. 1.

In that form of the present invention chosen for purposes of illustration, FIG. 1 shows a bird feeder, indicated generally at 10, having a hub 12 which is mounted to a suitable support means, such as a tree, post or the like, not shown, by suitable means, such as spike 14, and is freely rotatable thereon. The hub 12 is formed with a central recess 16 which received the head 18 of the mounting means 14 and has an opening 20 through which the mounting means 14 extends to the supporting structure, not shown. A cover 22 may be provided, having a frictional fit with the recess 16 to cover the head 18 of the mounting means 14 and to provide a decorative effect. The hub 12 extends outwardly from the central recess 16 and has a plurality of radially directed recesses 24 distributed about the front surface of the hub 12, as best seen in FIGS. 1, 2 and 3, and each of the recesses 24 has a hole 26 located at the inner end thereof, as seen in FIGS. 2 and 3. A plurality of arms 28 are provided, formed substantially Z-shaped, as seen in FIG. 4, each having a relatively long upper portion 30 extending horizontally forward with an inclined portion 32 extending from the rear end 34 of the horizontal portion 32 to a point approximately one-half the length of the horizontal portion 32, then extending vertically downward, as seen at 36, and terminating in a short rearwardly extending horizontal portion 38. The rearwardly extending portions 38 are each inserted through a respective one of the holes 26 in the hub 12 and the vertical portions 36 are fitted into the corresponding one of the recesses 24, as best seen in FIG. 1. When this is done, the inclined portions 32 extend radially outward substantially beyond the edge of the hub 12 with the large horizontal portions 30 projecting forwardly parallel to the axis of central recess 16 of the hub 12. As seen in FIG. 1, a plurality of buckets 40 is provided and each of the buckets 40 is suspended from a respective one of the arms 28 by means of a handle 42 placed on the horizontal portion 30 of a respective one of the arms 28, as seen in FIGS. 1 and 4.

In use, the mounting means 14 is inserted through the central recess 16 of hub 12 and through opening 20 and is driven into a suitable support structure, such as a tree, post or the like, not shown. Next, the rearwardly projecting horizontal portions 38 of the arms 28 are each inserted into a respective one of the holes 26 of the hub 12 and the vertical portions are placed in the corresponding one of the recesses 24 to support the arms 28. Thereafter, the buckets 40 are filled with birdseed or the like and the handles 42 are each placed on the forwardly projecting horizontal portions 30 of a respective one of the arms 28, in the manner shown in FIG. 1. In approaching the bird feeder 10, birds can land on the buckets 40 or on the arms 28. However, because the hub 12 is freely rotatable on the mounting means 14, when a bird lands on either side of the hub 12, the weight of the bird will cause the feeder 10 to rotate, due to gravity, in a direction to lower the bird to the lowest position. If a second bird lands on a bucket 40 or arm 28 on the same side of the hub 12, the rate of rotation will increase. On the other hand, if a bird lands on a bucket 40 or arm 28 on the opposite side of the hub 12, the rate of rotation will be slowed and the direction of movement may be reversed, depending upon the relative weights of the birds. This movement may cause some of the more timid birds to fly off, at first. However, they will soon realize that there is nothing to fear and will return and this will cause increased activity and color about the feeder 10, thereby increasing the enjoyment of the viewer.

Obviously numerous variations and modifications can be made without departing from the spirit of the present invention. Therefore, it should be clearly understood that the form of the present invention described above and shown in the figures of the accompanying drawing are illustrative only and are not intended to limit the scope of the present invention.

What is claimed is:

1. A bird feeder comprising:
   a freely rotatable hub having a plurality of radial recesses and a plurality of holes, each formed adjacent the inner end of a respective one of said radial recesses,
   a plurality of arms protecting radially substantially beyond the edge of said hub, and
   a plurality of feeding members, each suspended from a respective one of said arms.
2. The feeder of claim 1 wherein:
   said hub is mounted on a suitable supporting structure.
3. The feeder of claim 1 wherein:
   said hub is formed with a central recess having an opening at the rear thereof and means for mounting said hub extends through said opening.
4. The feeder of claim 1 wherein:
   said hub is formed with a plurality of radial recesses and each of said arms is located within a respective one of said recesses.
5. The feeder of claim 1 wherein:
   at least one of said arms is formed generally Z-shaped.
6. The feeder of claim 5 wherein:
   said one of said arms has a relatively large horizontal portion, an inclined portion extending downwardly from the rear end of said large portion to a point approximately one-half the length of said large portion, a vertical portion extending downward from the lower end of said inclined portion, and a relatively small horizontal portion extending rearwardly from the lower end of said vertical portion.
7. The feeder of claim 6 wherein:
   each of said arms has a relatively large horizontal portion, an inclined portion extending downwardly from the rear end of said large portion to a point approximately one-half the length of said large portion, a vertical portion extending downward from the lower end of said inclined portion, and a relatively small horizontal portion extending rearwardly from the lower end of said vertical portion and is inserted through a respective one of the holes in said hub.
8. The feeder of claim 1 wherein:
   each of said feeding members is a bucket having a handle suspending said bucket from a respective one of said arms.
9. The feeder of claim 3 wherein: said hub has a cover for said central recess to cover said recess.
10. The feeder of claim 9 wherein:
    said cover is decorative.
11. The feeder of claim 1 wherein:
    at least one of said feeding members is a bucket.
12. The feeder of claim 1 wherein:
    at least one of said feeders is a bag of birdseed.

* * * * *